United States Patent
Oyamada

(10) Patent No.: US 10,511,612 B2
(45) Date of Patent: Dec. 17, 2019

(54) SYSTEM AND METHOD OF DETECTING INTRUSION INTO COMMUNICATION ENVIRONMENT

(71) Applicant: FANUC CORPORATION, Yamanashi (JP)

(72) Inventor: Masahiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/874,381

(22) Filed: Jan. 18, 2018

(65) Prior Publication Data

US 2018/0212980 A1 Jul. 26, 2018

(30) Foreign Application Priority Data

Jan. 23, 2017 (JP) ................................ 2017-009625

(51) Int. Cl.
  *H04L 29/06* (2006.01)
  *G06F 9/455* (2018.01)
  *G06F 17/50* (2006.01)

(52) U.S. Cl.
  CPC .......... *H04L 63/1408* (2013.01); *G06F 17/50* (2013.01); *H04L 63/1425* (2013.01); *G06F 9/455* (2013.01); *H04L 63/145* (2013.01)

(58) Field of Classification Search
  CPC ............. H04L 63/1408; H04L 63/1425; H04L 63/145; G06F 9/455
  See application file for complete search history.

(56) References Cited

U.S. PATENT DOCUMENTS

| 9,065,725 B1 * | 6/2015 | Nanda ..................... H04L 43/04 |
| 9,240,976 B1 | 1/2016 | Murchison | |
| 9,542,554 B1 * | 1/2017 | Salsamendi ......... G06F 16/1748 |
| 2006/0074618 A1 | 4/2006 | Miller et al. | |

(Continued)

FOREIGN PATENT DOCUMENTS

| CN | 101465770 A | 6/2009 |
| CN | 103259806 A | 8/2013 |

(Continued)

OTHER PUBLICATIONS

Joseph Patrick Schorr, "Configuring Intrusion Detection in ISA Server", Techgenix, posted Apr. 5, 2001, Techgenix Ltd., 11pp.

*Primary Examiner* — Mohammad A Siddiqi
(74) *Attorney, Agent, or Firm* — Hauptman Ham, LLP

(57) ABSTRACT

A system capable of detecting an artful risk of intrusion into a communication environment, and protecting the communication environment from the risk. The system includes a security incident detection section configured to monitor information or communication in a communication environment and detect occurrence of a security incident in the communication environment, a normal workflow execution section configured to simulatively execute a normal workflow in a test communication environment in response to detection of the security incident by the security incident detection section, and a communication monitoring section configured to monitor information or communication in the test communication environment when executing the normal workflow in the test communication environment.

8 Claims, 14 Drawing Sheets

(56) References Cited

U.S. PATENT DOCUMENTS

| | | | |
|---|---|---|---|
| 2011/0167494 A1* | 7/2011 | Bowen | G06F 21/566 |
| | | | 726/24 |
| 2012/0224057 A1* | 9/2012 | Gill | G06F 21/55 |
| | | | 348/143 |
| 2012/0254951 A1 | 10/2012 | Munetoh et al. | |
| 2013/0111540 A1 | 5/2013 | Sabin | |
| 2013/0227690 A1 | 8/2013 | Kawaguchi et al. | |
| 2014/0115706 A1* | 4/2014 | Silva | H04L 63/1425 |
| | | | 726/23 |
| 2016/0080415 A1 | 3/2016 | Wu et al. | |
| 2017/0277891 A1* | 9/2017 | Keppler | G06F 21/566 |

FOREIGN PATENT DOCUMENTS

| | | |
|---|---|---|
| CN | 103294947 A | 9/2013 |
| CN | 103905451 A | 7/2014 |
| EP | 2631839 A1 | 8/2013 |
| JP | 2005-242754 A | 9/2005 |
| JP | 2012-212391 A | 11/2012 |
| JP | 2013-171556 A | 9/2013 |

* cited by examiner

SYSTEM AND METHOD OF DETECTING INTRUSION INTO COMMUNICATION ENVIRONMENT

RELATED APPLICATIONS

The present application claims priority to Japanese Patent Application No. 2017-009625 filed on Jan. 23, 2017, the disclosure of which is hereby incorporated by reference herein in its entirety.

BACKGROUND OF THE INVENTION

1. Field of the Invention

The present invention relates to a system of detecting intrusion into a communication environment and an intrusion detection method.

2. Description of the Related Art

In the related art, information security management systems for detecting intrusion into communication environments are known (e.g., JP 2005-242754 A).

In recent years, methods of communication network intrusion (e.g., malware) are becoming increasingly sophisticated. There is a strong demand for technology to detect such risks to communication environments, and to protect communication environments from the risks.

SUMMARY OF THE INVENTION

In an aspect of the present disclosure, a system configured to detect intrusion into a communication environment in which a plurality of communication devices are communicably connected via a communication network, includes a security incident detection section configured to monitor information or communication in the communication environment and detect occurrence of a security incident in the communication environment.

The system further includes a normal workflow execution section configured to simulatively execute a normal workflow in a test communication environment, when the security incident detection section detects the security incident. The normal workflow is predetermined to be executed in the communication environment by at least one of the communication devices.

The test communication environment is provided as a part of the communication environment, or as another communication environment different from the communication environment. The system further includes a communication monitoring section configured to monitor information or communication in the test communication environment when executing the normal workflow in the test communication environment.

In another aspect of the present disclosure, a method of detecting intrusion into a communication environment in which a plurality of communication devices are communicably connected via a communication network, includes monitoring information or communication in the communication environment, and detecting occurrence of a security incident in the communication environment.

The method further includes executing a normal workflow, which is predetermined to be executed in the communication environment by at least one of the communication devices, in a test communication environment provided as a part of the communication environment or another communication environment different from the communication environment, when detecting the security incident; and monitoring information or communication in the test communication environment when executing the normal workflow in the test communication environment.

BRIEF DESCRIPTION OF THE DRAWINGS

The objects, features and advantages of the present disclosure will become more apparent from the following description of the embodiments in connection with the accompanying drawings, in which.

DETAILED DESCRIPTION

Figure 1:
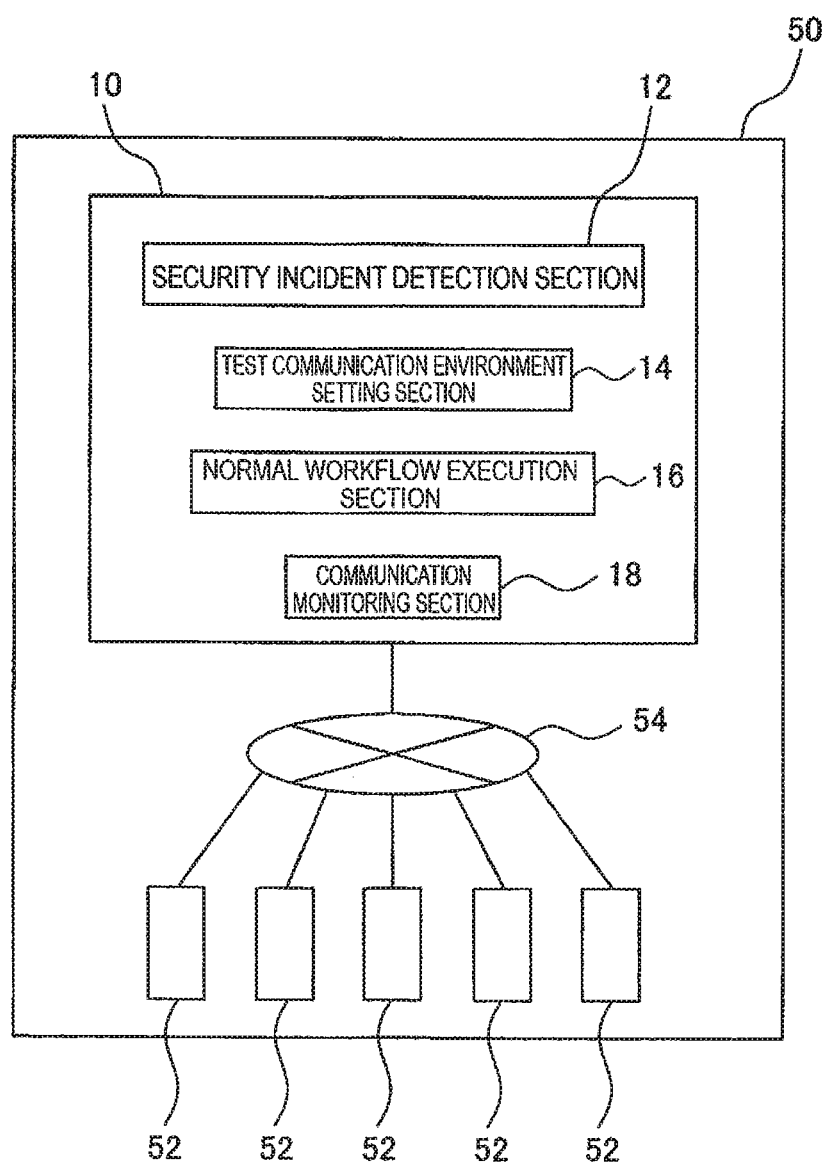
FIG. 1 is a block diagram of a communication environment according to an embodiment.

Embodiments of the present disclosure will be described below in detail with reference to the drawings. Note that, in various embodiments described below, similar elements are assigned the same reference numerals, and repetitive explanations thereof will be omitted.

First, a system 10 according to an embodiment will be described with reference to FIG. 1. The system 10 is configured to detect intrusion into a communication environment 50. In the communication environment 50, a plurality of communication devices 52 are communicably connected to each other via a communication network 54.

Each of the communication devices 52 is a computer, such as a server, a terminal device (e.g., PC, smart phone, tablet computer), a sensor (e.g., vision sensor of a robot, encoder, IC reader), or a storage device, which is configured to communicate with another device via the communication network 54.

For example, at least one of the communication devices 52 has a function of processing data to achieve a specific purpose, recording the operation of various sensors (e.g., the vision sensor of the robot, the encoder, or an IC reader described below), or executing software program.

At least one of the communication devices 52 includes an operating system (OS) and a tool for recording operation data of the communication device 52 logically connected to the OS, recording a log of the execution of a specific software program, or recording the usage state of the system.

If the communication device 52 is a robot as described later, this tool is configured to record operation of the robot (e.g., a rotation angle of a servo motor which drives the robot, or the coordinates of a robot hand, i.e., a tool coordinate system), in addition to arithmetic processing for operating the robot.

The communication network 54 includes a network switch (e.g., a layer 2 switch, a layer 3 switch), a router, a communication cable (e.g., an optical fiber cable), a wireless communication module, and the like.

The communication network 54 is configured to transmit information in a wired or wireless manner. The communication network 54 is e.g. an enterprise intranet or a local area network (LAN), and is communicably connected to a communication network (e.g., the Internet) outside of the communication environment 50.

The system 10 is communicably connected to the communication network 54 and constitute the communication environment 50. For example, the system 10 includes a server having an arithmetic processing unit (e.g., CPU) and a storage. Alternatively, the system 10 may be comprised of a plurality of communication devices. The system 10 includes a security incident detection section 12, a test communication environment setting section 14, a normal workflow execution section 16, and a communication monitoring section 18.

Below, the functions of the security incident detection section 12, the test communication environment setting section 14, the normal workflow execution section 16, and the communication monitoring section 18 will be described with reference to FIG. 1 to FIG. 5.

The security incident detection section 12 is configured to monitor information stored in the communication environment 50 or communication carried out in the communication environment 50, and detect occurrence of a security incident in the communication environment 50.

The information stored in the communication environment 50 includes e.g. various data recorded in the communication devices 52, data relating to the operation of the communication devices 52, a log of the execution of a specific software by the communication device 52, data relating to the usage state of the system, etc.

The security incident includes e.g. communication which is to be not carried out in a normal workflow described later, a device operation record of the communication device 52 that are determined to be abnormal by statistical analysis, execution of a software with an abnormal setting, alteration of the basic behavior of the communication device 52 occurred by execution of a software, unauthorized access to the communication device 52 by individuals who do not have access authority, etc.

The security incident detection section 12 is configured to detect the security incident by monitoring information stored in the communication devices 52 (e.g., the operation data of the communication devices 52, the software-execution log, the data of the usage status of the system) or communication between at least two of the communication devices 52.

As an example, the security incident detection section 12 defines a detection pattern (detection pattern for data in a packet in the case of the packet-type communication) for detecting unauthorized access based on the characteristics of the individual unauthorized access. When data or a log matching the detection pattern occurs, the security incident detection detects it as the security incident.

As another example, when recording device-operation data, recording the software-execution log, or alteration to basic behavior, that is statistically determined to be abnormal, is carried out in the communication device 52, the security incident detection section 12 automatically analyzed this event. Then, the security incident detection section 12 detects this event as the security incident if this event is not carried out by a legitimate operator.

For example, if the communication device 52 is a machine tool or a robot wherein the operation program thereof is altered, the security incident detection section 12 carries out a statistical determination processing against the communication in the communication environment 50, the device-operation record of each communication device 52, the software-execution log, or the data of combination thereof, which is occurred when the operation program is altered, so as to determine whether or not the alteration is unauthorized.

As still another example, the security incident detection section 12 is configured to continuously acquire the records of a normal state of the communication in the communication environment 50, while predetermining a fraudulent communication state deviating from the legitimate records of the normal state occurred in the normal workflow, by means of a statistical technique. Then, the security incident detection section 12 statistically determine the difference between the actual communication state and the fraudulent communication state, and detect the security incident if there is a significant difference between them.

The test communication environment setting section 14 is configured to set a test communication environment when the security incident detection section 12 detects the security incident. As an example, the test communication environment setting section 14 sets a virtual communication environment 60V (FIG. 3), which virtualizes the communication environment 60 illustrated in FIG. 2, as the test communication environment 60V.

Figure 2:
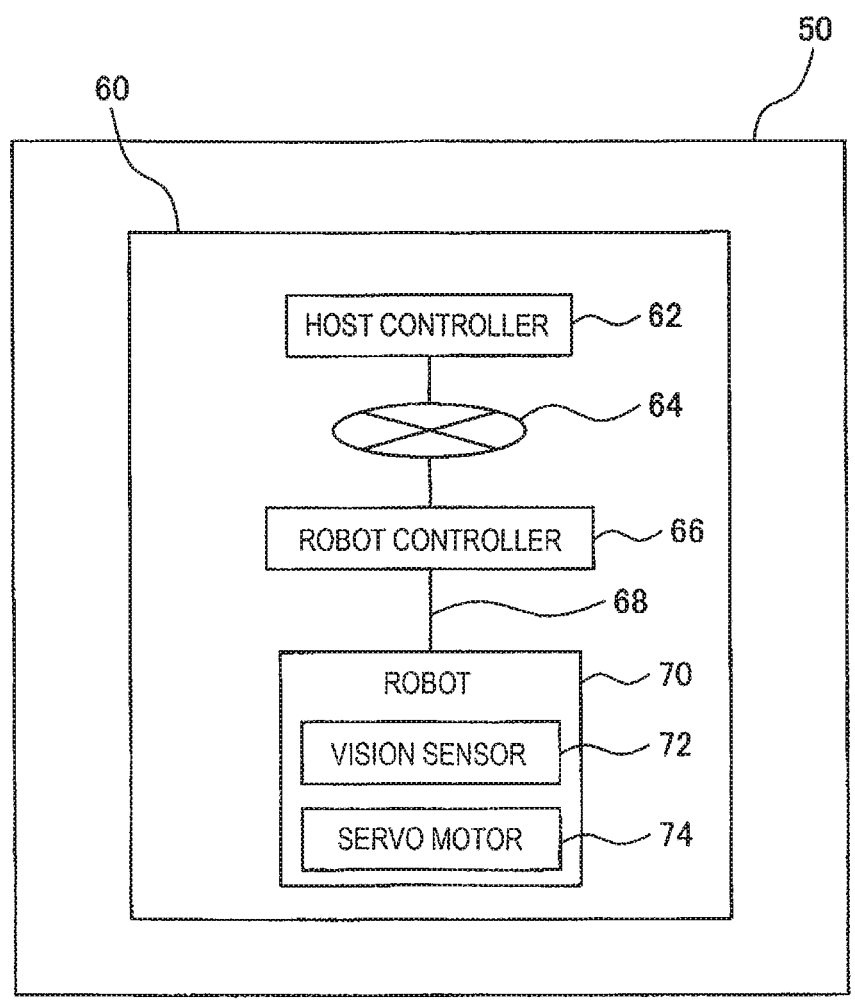
FIG. 2 is a block diagram of a communication environment constituting one section of the communication environment illustrated in FIG. 1.

The communication environment 60 in FIG. 2 constitutes one section of the above-mentioned communication environment 50, and includes a host controller 62, a communication network 64, a robot controller 66, a communication cable 68, and a robot 70.

The communication network 64 includes a network switch, a router, a communication cable, a wireless communication module, etc., and constitute one section of the above-mentioned communication network 54. The communication network 64 communicably connects the host controller 62 and the robot controller 66 to each other.

The communication cable 68 is a constituent of the above-described communication network 54, and communicably connects the robot controller 66 with a vision sensor 72 and servo motors 74.

The robot 70 is e.g. a vertical articulated industrial robot configured to carry out a predetermined work. The work includes transporting, machining or welding a workpiece (not illustrated). The robot 70 includes the vision sensor 72 and the servo motors 74.

The vision sensor 72 image an object such as a workpiece when the robot 70 carries out a work. The servo motors 74 are incorporated in movable elements (e.g., a revolving drum, robot arm, wrist, robot hand) of the robot 70, and be configured to operate these movable elements.

The host controller 62, the robot controller 66, the vision sensor 72, and the servo motors 74 respectively constitute the communication devices 52 illustrated in FIG. 1. The host controller 62 includes an arithmetic processing unit (e.g., a CPU) and a storage (e.g., ROM or RAM), and transmits a command to the robot controller 66 via the communication network 64.

At this time, the host controller 62 may transmit the commands to the robot controller 66 in the form of a ladder program via a programmable logic controller (PLC) that constitutes one of the communication devices 52. For example, the host controller 62 is a production management device that manages the production schedule of products produced in a factory, and transmits a work command to the robot controller 66 in order to operate the robot 77 in accordance with the production schedule. The robot controller 66 includes an arithmetic processing unit (e.g., a CPU) and a storage (e.g., ROM or RAM), and is configured to directly or indirectly control each component of the robot 70. The robot controller 66 operates the robot 70 in accordance with the work command from the host controller 62 so as to cause the robot 70 to carry out a work (transporting, processing, or welding a workpiece).

When operating the robot 70, the robot controller 66 communicates with the vision sensor 72 and the servo motors 74. In particular, the robot controller 66 transmits an imaging command to the vision sensor 72. The vision sensor 72 images an object such as a workpiece in response to the imaging command from the robot controller 66, and transmits the captured image to the robot controller 66.

The robot controller 66 generate commands (e.g., torque command or speed command) for the servo motors 74 based on the image received from the vision sensor 72, and transmit them to the servo motors 74.

In accordance with the command from the robot controller 66, the servo motors 74 drive the movable elements of the robot 70, and transmit feedbacks (e.g., feedback current or load torque) to the robot controller 66. The robot controller 66 operates the robot 70 together with carrying out such communications.

While operating the robot 70, the robot controller 66 records the angles of the joints of the robot 70 (i.e., the rotation angles of the servo motors 74) and the position of a robot hand (not illustrated) provided in the robot 70 in the robot coordinate system (i.e., the position of a tool coordinate system in the robot coordinate system) as information stored in the communication environment, with using a communication function for monitoring the state of the robot 70.

When the work carried out by the robot 70 is completed, the robot controller 66 transmits a work-completion signal to the host controller 62 via the communication network 64.

In this way, the host controller 62, the robot controller 66, the vision sensor 72, and the servo motors 74 carry out the above-described series of operations together with communicating with each other in the communication environment 60.

Figure 3:
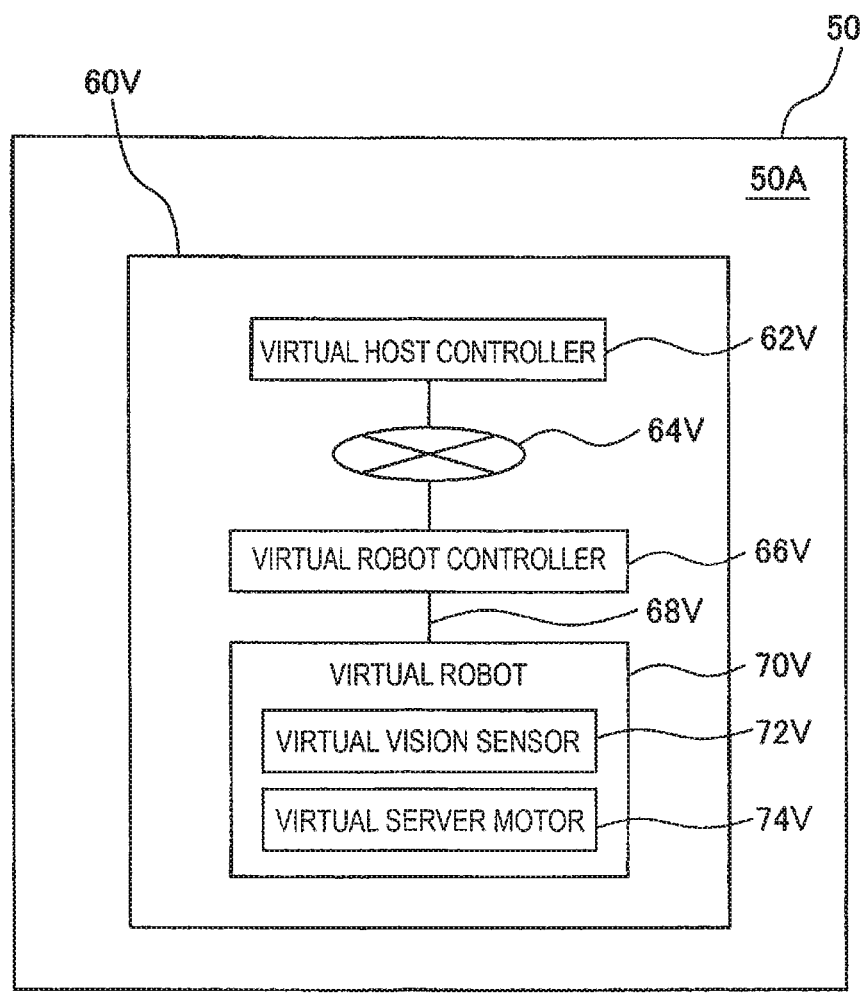
FIG. 3 is a block diagram illustrating a state in which a test communication environment is established in the communication environment illustrated in FIG. 1, by virtualizing the communication environment illustrated in FIG. 2.

When the security incident detection section 12 detects a security incident, the test communication environment setting section 14 virtualizes the communication environment 60 illustrated in FIG. 2 so as to establish the virtual communication environment 60V as illustrated in FIG. 3.

The virtual communication environment 60V includes a virtual host controller 62V, a virtual communication network 64V, a virtual robot controller 66V, a virtual communication cable 68V, and a virtual robot 70V.

The virtual host controller 62V is structured by making use of the resource of at least one communication device 52. For example, the virtual host controller 62V is structured as a logical server within one communication device 52 that is a server. In this case, the one communication device 52 simulatively executes the function of the host controller 62 (e.g., communication with the robot controller 66) with using the arithmetic processing resource for virtualization.

Similarly, the virtual robot controller 66V is structured by making use of the resource of at least one communication device 52. For example, the virtual robot controller 66V is structured as a logical server within one communication device 52 that is a server. In this case, the one communication device 52 simulatively executes the function of the robot controller 66 with using the arithmetic processing resource for virtualization.

In particular, the virtual robot controller 66V simulatively operates the virtual robot 12 together with communicating with the virtual host controller 62V, the virtual vision sensor 72V, and the virtual servo motors 74V. The communication carried out in the virtual communication environment 60V at this time is recorded in at least one communication device 52 (e.g., the communication device 52 used as the resource for virtualization of the virtual communication environment 60V).

Also, while the virtual robot controller 66V simulatively operates the virtual robot 70V, the angles of the joints of the virtual robot 70V (i.e., the rotation angles of the virtual servo motors 74V) and the position of a virtual robot hand (not illustrated) provided in the virtual robot 70V in the robot coordinate system (i.e., the position in the tool coordinate system in the robot coordinate system) are recorded as information in at least one communication device 52.

The virtual communication network 64V is virtualization of the communication network 54, and is structured by making use of the resources of the network switch, the router, the communication cable, and the wireless communication module that constitute the communication network 54. The virtual communication network 64V communicably connects the virtual host controller 62V and the virtual robot controller 66V. The virtual robot 70V includes a virtual vision sensor 72V virtualizing the vision sensor 72 and virtual servo motors 74V virtualizing the servo motors 74. Each of the virtual vision sensor 72V and the virtual servo motors 74V is structured by making use of the resource of at least one communication device 52.

For example, each of the virtual vision sensor 72V and the virtual servo motors 74V is logically structured in one communication device 52 of a PC. In this case, the one communication device 52 simulatively executes each function of the vision sensor 72 and the servo motors 74 (e.g., communication with the robot controller 66) with using the resource of the arithmetic processing for virtualization.

The virtual communication cable 68V is virtualization of the communication network 68, and is structured by making use of the resource of the communication cable constituting the communication network 68. The virtual communication cable 68V communicably connects the virtual robot controller 66V with the virtual vision sensor 72V and the virtual servo motors 74V.

In this way, the test communication environment setting section 14 sets the virtual communication environment (i.e., a test communication environment) 60V as a part of the communication environment 50, as illustrated in FIG. 3.

Figure 4:
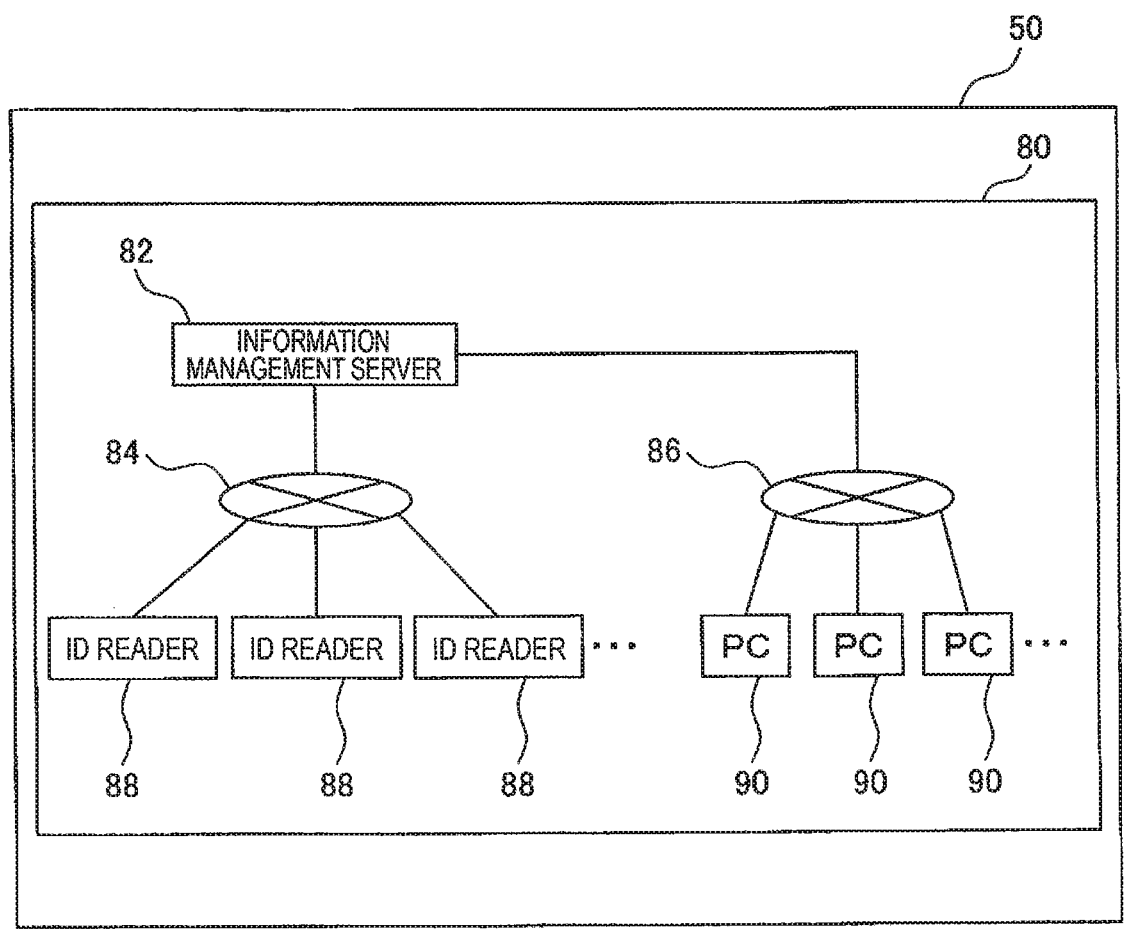
FIG. 4 is a block diagram of a communication environment constituting one section of the communication environment illustrated in FIG. 1.

As another example, the test communication environment setting section 14 sets the virtual communication environment 80V (FIG. 5) virtualizing the communication environment 80 illustrated in FIG. 4, as test communication environment 80V.

The communication environment 80 is one section of the communication environment 50, and includes an information management server 82, communication networks 84 and 86, a plurality of ID readers 88, and a plurality of PCs 90.

Each of the communication networks 84 and 86 includes a network switch, a router, a communication cable, and a wireless communication module, etc., and constitute one section of the communication network 54 described above.

The communication network 84 communicably connect the information management server 82 and the plurality of ID readers 88. The communication network 86 communicably connects the information management server 82 and the plurality of PCs 90. The information management server 82, the ID reader 88, and the PCs 90 respectively constitute the communication devices 52 illustrated in FIG. 1.

The ID reader 88 wirelessly communicates with an IC tag embedded in an ID card possessed by an employee by radio frequency identification (RFID) technology, and acquires an ID number of the employee recorded in the IC tag. The ID reader 88 transmits the acquired ID number to the information management server 82 via the communication network 84.

The PCs 90 are assigned to the individual employees, and each employee logs in to the PC 90 assigned to him/her and uses the PC 90 to carry out various operations. The PC 90 transmits login information (e.g., login ID, login date and time) by the employee to the information management server 82 via the communication network 84.

The information management server 82 includes an arithmetic processing unit (e.g., a CPU) and a storage (e.g., a ROM or a RAM), and is configured to collect ID numbers and login information transmitted from the ID readers 88 and the PCs 90, and store this information in the storage. The information management server 82 manages the work time or the work flow of the employee based on the collected ID number and login information.

Figure 5:
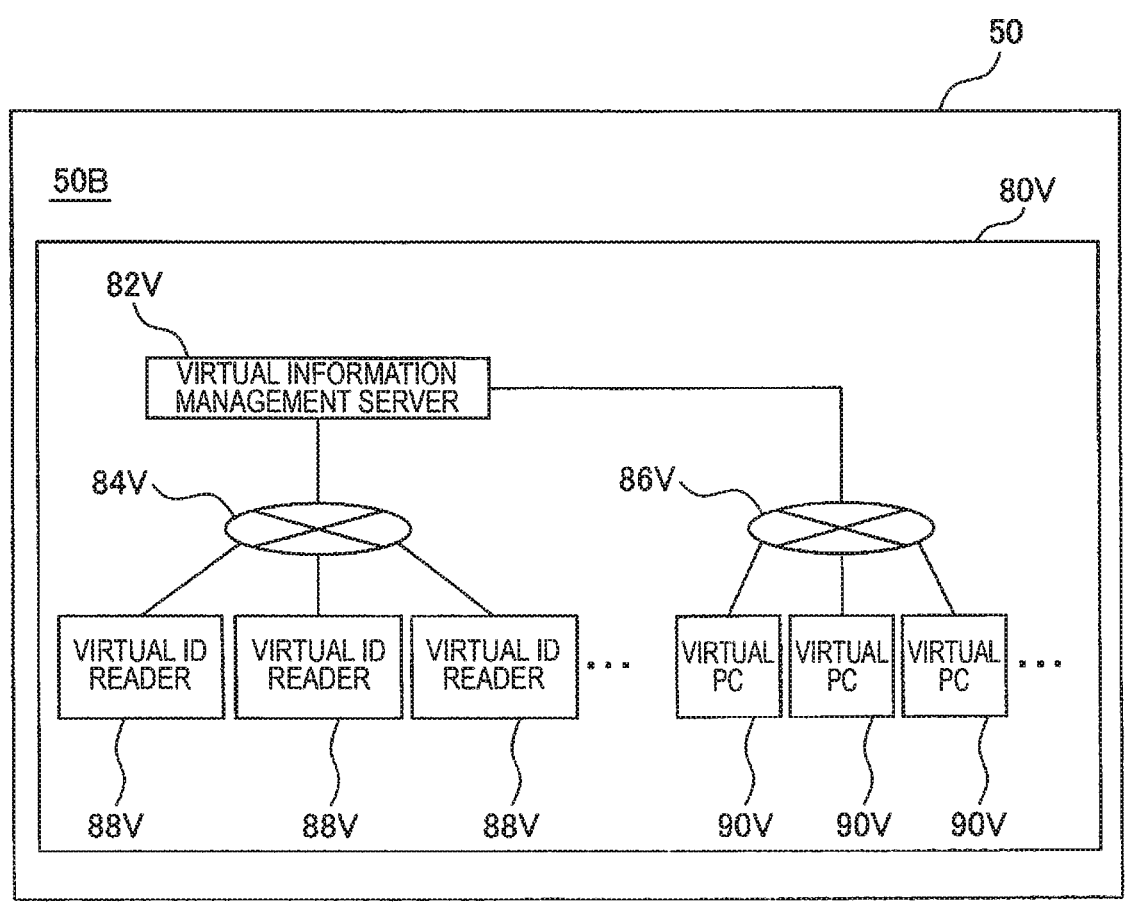
FIG. 5 is a block diagram illustrating a state in which a test communication environment is established in the communication environment illustrated in FIG. 1, by virtualizing the communication environment illustrated in FIG. 4.

When the security incident detection section 12 detects a security incident, the test communication environment setting section 14 virtualizes the communication environment 80 illustrated in FIG. 4, so as to establish the virtual communication environment 80V illustrated in FIG. 5.

The virtual communication environment 80V includes a virtual information management server 82V, virtual communication networks 84V and 86V, a plurality of virtual ID readers 88V, and a plurality of virtual PCs 90V.

The virtual information management server 82V is structured by making use of the resource of at least one communication device 52. For example, the virtual information management server 82V is structured as a logical server in one communication device 52 that is a server. In this case, the one communication device 52 simulatively carries out the function (e.g., collection of ID numbers and login information) of the information management server 82 with using the resource of the arithmetic processing of virtualization.

Data processing executed in the virtual communication environment 80V while this operation is carried out is recorded in at least one communication device 52 (e.g., the communication device 52 used as a resource for virtualization of the virtual communication environment 80V).

Each of the virtual ID readers 88V is structured with using the resource of at least one communication device 52. For example, the virtual ID reader 88V is structured as a logical server in one communication device 52 that is a server. In this case, the one communication device 52 simulatively executes the functions (e.g., acquisition and transmission of ID numbers) of the ID reader 88 with using the resource of the arithmetic processing of virtualization.

Each of the virtual PCs 90V is structured with using the resource of at least one communication device 52. For example, the virtual PC 90V is constructed by virtualizing the OS and software of the PC 90, in one communication device 52 that is a server. In this case, the one communication device 52 simulatively executes the function (e.g., transmission of login information) of the PC 90 with using the resource of the arithmetic processing of virtualization.

Each of the virtual communication networks 84V and 86V is virtualization of the communication network 54, is structured with using the resources of the network switch, the router, the communication cable, and the wireless communication module that constitute the communication network 54.

The virtual communication network 84V communicably connects the virtual information management server 82V and the plurality of virtual ID readers 88V. Similarly, the virtual communication network 86V communicably connects the virtual information management server 82V and the plurality of virtual PCs 90V.

In this way, as illustrated in FIG. 5, the test communication environment setting section 14 sets the virtual communication environment (i.e., the test communication environment) 80V as a part of the communication environment 50. The test communication environment setting section 14 may further virtualize components of the virtual communication environment 60V or 80V with using the resource of the communication devices 52, to the extent that it does not exceed the allowable amount of resource of the communication device 52 that is used for virtualization.

In this case, if the security incident detection section 12 detects that the attack target by malware, etc. is not the communication device 52 used for virtualization, the test communication environment setting section 14 may determine whether to further virtualize the virtual communication environment 60V or 80V, based on the detection result of the security incident detection section 12.

When the security incident detection section 12 detects a security incident, the normal workflow execution section 16 simulatively executes a normal workflow in the test communication environment 60V, 80V. This normal workflow is an operation flow that is predetermined to be executed in the communication environment 50 by at least one communication device 52 as a regular operation.

As an example, when the test communication environment setting section 14 sets the test communication environment 60V illustrated in FIG. 3, the normal workflow execution section 16 causes the virtual host controller 62V, the virtual robot controller 66V, the virtual vision sensor 72V, and the virtual servo motors 74V to execute the following normal workflow in the test communication environment 60V.

In particular, the virtual host controller 62V transmits a virtual work command to the virtual robot controller 66V. In accordance with the virtual work command from the virtual host controller 62V, the virtual robot controller 66V simulatively operates the virtual robot 70V so as to simulatively carry out a work (e.g., simulative execution of operation programs for transportation, machining, and welding of a workpiece, transmission of an I/O command to a peripheral device).

During the execution of this virtual operation, the virtual robot controller 66V transmits a virtual imaging command to the virtual vision sensor 72V. Based on the virtual imaging command from the virtual robot controller 66V, the virtual vision sensor 72V generates a virtual image simulatively imaging an object, and transmits the generated virtual image to the virtual robot controller 66V.

The virtual robot controller 66V simulatively generates commands for the virtual servo motors 74V based on the virtual image received from the virtual vision sensor 72V, and transmit them to the virtual servo motors 74V.

The virtual servo motors 74V are simulatively driven in accordance with the commands from the virtual robot controller 66V, and transmit virtual feedback (e.g., virtual feedback current or virtual load torque) to the virtual robot controller 66V.

The normal workflow execution section 16 controls the resources of the communication devices 52 of the communication environment 50 in which the virtual host controller 62V, the virtual robot controller 66V, the virtual vision sensor 72V, and the virtual servo motors 74V are structured, and simulatively execute the above-described sequential normal workflow in the test communication environment 60V.

In this respect, the normal workflow execution section 16 simulatively executes the normal workflow in the test communication environment 60V at a higher or lower speed than when the host controller 62, the robot controller 66, the vision sensor 72, and the servo motors 74 execute the normal workflow in the communication environment 50.

For example, the normal workflow execution section 16 sets the standard time, that defines the time in the test communication environment 60V, to elapse faster (or slower) than the standard time in the communication environment 50 (i.e., the actual standard time).

Alternatively, the normal workflow execution section 16 sets the communication cycle performed between the virtual host controller 62V, the virtual robot controller 66V, the virtual vision sensor 72V, and the virtual servo motors 74V when executing the normal workflow in the test communication environment 60V to be shorter (or longer) than when executing the normal workflow in the communication environment 50.

By such methods, the workflow execution section 16 can execute the normal workflow in the test communication environment 60V at a higher (or lower) speed than when executing the normal workflow in the communication environment 50.

Here, the normal workflow execution section 16 may sequentially change the speed at which the normal workflow is executed in the test communication environment 60V, based on the content of the security incident detected by the security incident detection section 12.

For example, it is assumed that intrusion of malware for stealing a log data when the robot controller 66 executes a specific software (e.g., an operation program of the robot 70) is suspected from the security incident detected by the security incident detection section 12.

In this case, the normal workflow execution section 16 executes in the test communication environment 60V the simulative processes before the execution of this specific software by the virtual robot controller 66V at a higher speed than when executing the normal workflow in the communication environment 50.

Then, the normal workflow execution section 16 carries out the process, in which the virtual robot controller 66V executes the specific software, at the same speed or a slower speed than when executing the normal workflow in the communication environment 50. In this way, the normal workflow execution section 16 can change the speed at which the normal workflow is executed in the test communication environment 60V, in response to the content of the detected security incident.

Further, the normal workflow execution section 16 executes the normal workflow in the test communication environment 60V such that the data processing sequence is the same as when the normal workflow is executed in the communication environment 50.

Further, the normal workflow execution section 16 executes suitable data processing at the same timing as when the normal workflow is executed in the communication environment 50. For example, it is assumed that the host controller 62 is scheduled to execute data processing A at a standard time of 13:00 when executing the normal workflow in the communication environment 50.

In this case, the normal workflow execution section 16 causes the virtual host controller 62V to simulatively execute the data processing A at the standard time of 13:00 in the test communication environment 60V. In this way, when the normal workflow is executed at a high speed or a low speed in the test communication environment 60V, the normal workflow execution section 16 carries out various operations with the same sequence and timing as when the normal workflow is executed in the communication environment 50.

As another example, when the test communication environment setting section 14 sets the test communication environment 80V illustrated in FIG. 5, the normal workflow execution section 16 causes the virtual information management server 82V, the virtual ID reader 88V, and the virtual PCs 90 to execute the following normal workflow in the test communication environment 80V.

In particular, the virtual ID reader 88V simulatively executes the operation of acquiring the ID number from the ID card, and transmitting the acquired virtual ID number to the virtual information management server 82V via the virtual communication network 84V.

In addition, the virtual PC 90V simulatively executes a login operation to this virtual PC 90V, and transmits the virtual login information (e.g., login ID, login date and time) to the virtual information management server 82V via the virtual communication network 84V.

The virtual information management server 82V collects the virtual ID number and the virtual login information transmitted from the virtual ID reader 88V and the virtual PC 90V, and simulatively executes an operation of managing the work time or work flow of the employees, based on the collected virtual ID number and the virtual login information.

The normal workflow execution section 16 controls the resources of the communication devices 52 of the communication environment 50 in which the virtual information management server 82V, the virtual ID reader 88V, and the virtual PCs 90V are structured, and simulatively executes the above-described sequential normal workflow in the test communication environment 80V.

In this respect, the normal workflow execution section 16 simulatively executes the normal workflow in the test communication environment 80V at a higher or lower speed than when the information management server 82, the ID reader 88, and the PC 90 execute the normal workflow in the communication environment 50.

For example, the normal workflow execution section 16 may set the standard time that defines the time in the test communication environment 80V to elapse faster (or slower) than the standard time in the communication environment 50.

Alternatively, the normal workflow execution section 16 may set the communication cycle performed between the virtual information management server 82V, the virtual ID reader 88V, and the virtual PC 90V when executing the normal workflow in the test communication environment 80V to be shorter (or longer) than when executing the normal workflow in the communication environment 50.

By such methods, the normal workflow execution section 16 can execute the normal workflow in the test communication environment 80V at a higher (or lower) speed than in the communication environment 50.

The communication monitoring section 18 monitors the information and communication in the test communication environment 60V, 80V when the normal workflow execution section 16 simulatively executes the normal workflow in the test communication environment 60V, 80V.

In particular, the communication monitoring section 18 records all the information (various data, logs) accumulated in the test communication environment 60V, 80V and all the communication carried out in the test communication environment 60V, 80V in the storage of the system 10.

Also, in response to a request from the operator, the communication monitoring section 18 displays the information and communication in the test communication environment 60V, 80V on a display (not illustrated). Due to this, the operator can judge whether the communication in the test communication environment 60V, 80V is appropriate.

Note that, the functions of the security incident detection section 12, the test communication environment setting section 14, the normal workflow execution section 16, and the communication monitoring section 18 mentioned above is carried out by the arithmetic processing unit of the server (or at least one communication device) constituting the system 10.

Figure 6:
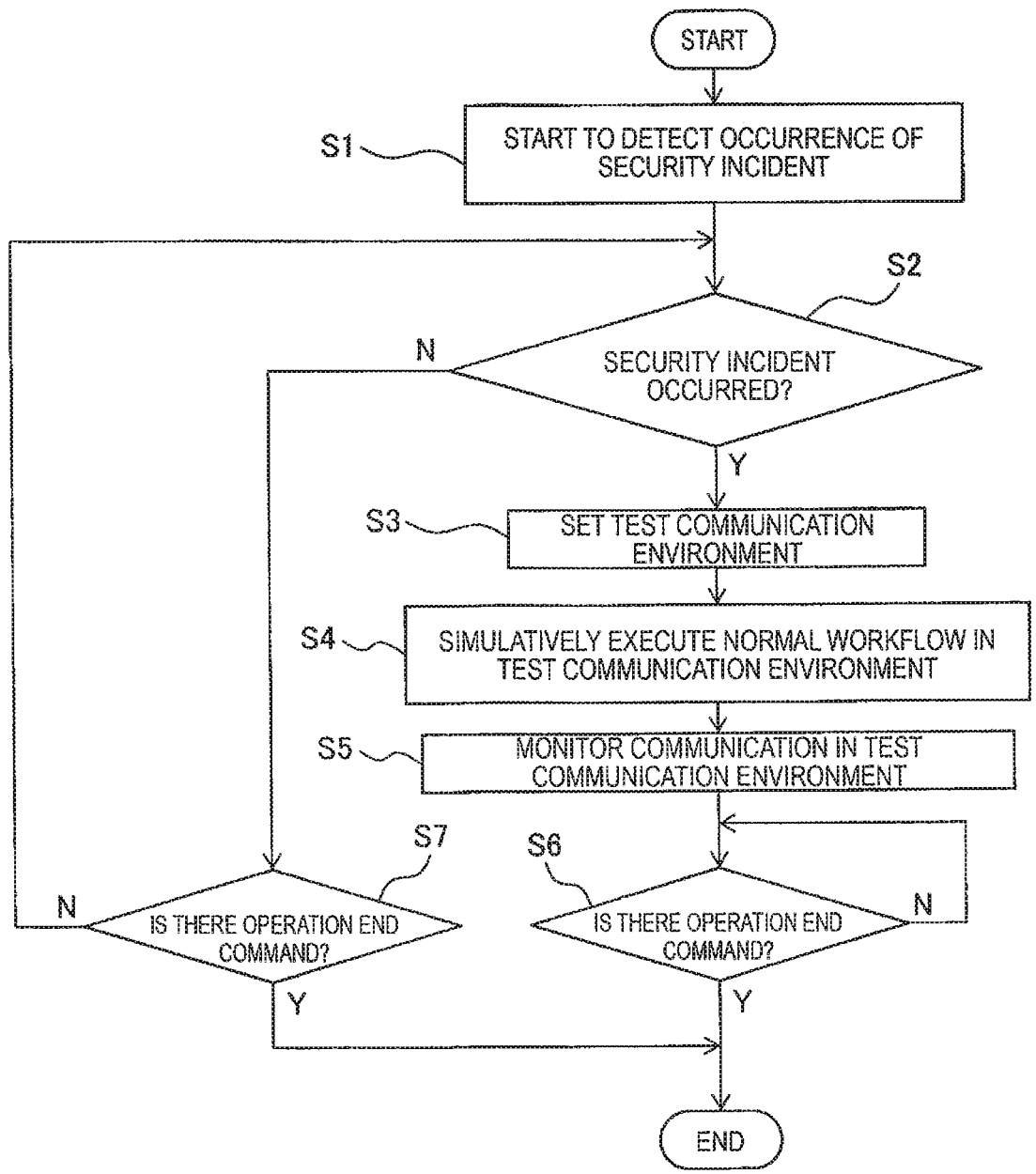
FIG. 6 is a flowchart illustrating an example of an operation flow of the system illustrated in FIG. 1.

Next, an example of the operation flow of the system 10 will be described with reference to FIG. 6. The operation flow illustrated in FIG. 6 is started when the arithmetic processing unit of the system 10 receives from the operator a monitoring command for monitoring intrusion into the communication environment 50.

In Step S1, the security incident detection section 12 starts to detect the occurrence of a security incident in the communication environment 50.

As an example, the security incident detection section 12 sequentially compares the data, logs, etc., generated in the communication of the communication environment 50 with the detection pattern for detecting unauthorized access. As another example, the security incident detection section 12 detects a difference between a communication state actually performed in the communication environment 50 and a predetermination fraud communication state.

In Step S2, the security incident detection section 12 determines whether a security incident occurs in the communication environment 50.

As an example, the security incident detection section 12 determines whether data or a log matching with the detection pattern is generated. As another example, the security incident detection section 12 determines whether a significant difference occurs between the communication state actually performed in the communication environment 50 and the fraud communication state.

If the data or log matching with the detection pattern is generated or the difference between the communication state actually performed in the communication environment 50 and the fraud communication state occurs, the security incident detection section 12 determines "YES", and proceeds to Step S3.

On the other hand, if the data or log matching with the detection pattern is not generated or the difference does not occur between the communication state actually performed in the communication environment 50 and the fraud communication state, the security incident detection section 12 determines "NO", and proceeds to Step S7.

In Step S3, the test communication environment setting section 14 sets the test communication environment 60V, 80V in the communication environment 50. For example, as described above, the test communication environment setting section 14 sets the virtual communication environment 60V illustrated in FIG. 3 or the virtual communication environment 80V illustrated in FIG. 5 as the test communication environment 60V or 80V.

In Step S4, the normal workflow execution section 16 simulatively executes the normal workflow in the test communication environment 60V, 80V. For example, the normal workflow execution section 16 causes the virtual host controller 62V, the virtual robot controller 66V, the virtual vision sensor 72V, and the virtual servo motors 74V to execute the above-described normal workflow in the test communication environment 60V.

Alternatively, the normal workflow execution section 16 causes the virtual information management server 82V, the virtual ID reader 88V, and the virtual PC 90V to execute the above-described normal workflow in the test communication environment 80V.

In Step S5, the communication monitoring section 18 monitors the information and communication in the test communication environment 60V, 80V. In particular, the communication monitoring section 18 records all the information accumulated in the test communication environment 60V, 80V and all communication carried out in the test communication environment 60V, 80V in the storage of the system 10. Then, the communication monitoring section 18 displays the information and communication in the test communication environment 60V or 80V on the display.

Note that, the communication monitoring section 18 statistically may compare the communication carried out in the test communication environment 60V, 80V with the communication which is to be carried out in the communication environment 50 when the normal workflow is properly executed, and determine whether there is a significant difference therebetween. When there is the difference therebetween, the communication monitoring section 18 may transmit a warning to the operator by sound or image.

In Step S6, the arithmetic processing unit of the system 10 determines whether it receives an operation end command from the operator. If the arithmetic processing unit of the system 10 receives the operation end command, it determines "YES", and ends the flow depicted in FIG. 6. On the other hand, if the arithmetic processing unit of the system 10 does not receive the operation end command, it determines "NO", and loops Step S6.

Thus, the normal workflow execution section 16 continuously executes the normal workflow in the test communication environment 60V, 80V until it is determined "YES" in Step S6, and the communication monitoring section 18 continuously monitors the communication in the test communication environment 60V, 80V.

Due to this, when a risk, such as malware having a latency period, intrudes into the communication environment 50, it is possible to detect and analyze the risk. This effect will be described below.

Hereinafter, it is assumed that malware, which has a latency period programmed to attack the information or communication (e.g., communication interference, leaking or tampering information) in the normal workflow carried out in the communication environment 50, intrudes into the communication environment 50. Since such malware is not active during the latency period, it is very difficult to detect the malware during the latency period.

In this embodiment, in order to intentionally activate the malware, the normal workflow execution section 16 simulatively executes in the test communication environment 60V, 80V (Step S4) the normal workflow which is to be carried out in the communication environment 50 as a normal operation.

By this, the malware, which has intruded into the communication environment 50 and been latent there, mistakenly recognizes the communication or information in the normal workflow carried out in the test communication environment 60V, 80V as an attack target, and is activated in the test communication environment 60V, 80V. Then, the malware starts to attack the communication or information in the normal workflow carried out in the test communication environment 60V, 80V.

For example, the malware may try to interfere with the transmission of the virtual image from the virtual vision sensor 72V to the virtual robot controller 66V when the normal workflow is executed in the test communication environment 60V.

Alternatively, when the normal workflow is executed in the test communication environment 80V, the malware may try to steal the ID number transmitted from the virtual ID reader 88V to the virtual information management server 82V and divulge it to a communication network outside of the communication environment 50.

Since the communication monitoring section 18 monitors the information and communication in the test communication environment 60V, 80V, the operator can monitor the information and communication in the test communication environment 60V, 80V through the communication monitoring section 18. Accordingly, the operator can analyze the behavior of malware active in the test communication environment 60V, 80V in detail.

In this embodiment, the normal workflow execution section 16 continuously executes the normal workflow even after an anomaly occurs in the communication or information in the normal workflow executed in the test communication environment 60V, 80V due to the malware activity. Due to this, it is possible to cause the malware to be active until it achieves its purpose.

Note that, if there is a possibility that an anomaly of the communication or information due to the malware may occur in the system 10, or that the regular operation in the communication environment 50 is interfered with, the normal workflow execution section 16 may shut down the normal workflow executed in the test communication environment 60V, 80V when such an anomaly occurs.

In this way, the operator can analyze the purpose and behavior of the malware in detail, and from the result of the analysis, it is possible to find the source of the malware easier. Further, the operator can prepare an effective defensive measure against the malware.

Note that, the storage of the system 10 may pre-store specific events of the information or communication anomalies caused by malware (e.g., generation of information or communication which is determined to be anomalous by statistical analysis, suspension or delay of communication, deletion or tampering information), which can be obtained by means of simulation, etc.

Then, in response to the malware attacking information or communication in the test communication environment 60V, 80V, the workflow execution section 16 may allow such events to occur in the test communication environment 60V, 80V. According to this configuration, the malware can be deceived more deftly, thereby may more reliably be active until it achieves its purpose.

If the malware is caused to achieve its purpose in the test communication environment 60V, 80V in this way, the behavior of the malware at this time may be useful evidence to accurately estimate the motive and position of the attacker.

Further, the operator who manages the communication environment 50 can judge whether the malware poses a serious risk to the normal operation in the communication environment 50 at the time when the malware has achieved its purpose. Then, the operator can decide a countermeasure, e.g., shutting down the normal workflow, if he/she judges that the malware may become a serious risk.

When the purpose of the malware (i.e., attacking specific information or communication) is identified as the normal workflow is executed in the test communication environment 60V, 80V, the normal workflow execution section 16 may continuously execute only processes, that relates to the information or communication being attacked, in the test communication environment 60V, 80V, while suspending other processes.

For example, it is assumed that the malware having the purpose of disrupting the transmission of the virtual image from the virtual vision sensor 72V to the virtual robot controller 66V is identified when the normal workflow is executed in the test communication environment 60V.

In this case, the normal workflow execution section 16 executes only processes of the normal workflow carried out in the test communication environment 60V, which are for the communication between the virtual robot controller 66V and the virtual vision sensor 72V, while suspending other processes.

Alternatively, it is assumed that the malware having the purpose of stealing the ID number transmitted from the virtual ID reader 88V to the virtual information management server 82V is identified when the normal workflow is executed in the test communication environment 80V.

In this case, the normal workflow execution section 16 executes only processes of the normal workflow carried out in the test communication environment 80V, which are for the communication between the virtual information management server 82V and the virtual ID reader 88V, or for recording the ID number in the virtual information management server 82V, while suspending other processes.

According to this configuration, the amount of information processing when executing the normal workflow in the test communication environment 60V, 80V can be reduced, along with the malware being active until it achieves its purpose. Thereby, it is possible to reduce the load on the resources of the communication environment 50 when executing the normal workflow.

Note that, as a safeguard for when the communication in the test communication environment 60V, 80V goes down as a result of the malware activity, the system 10 may has a function for restoring the communication in the test communication environment 60V, 80V.

Referring again to FIG. 6, if it is determined "NO" in Step S2, in Step S7, the arithmetic processing unit of the system 10 determines whether it receives the operation end command from the operator, similarly as the above-described Step S6.

If the arithmetic processing unit of the system 10 receives the operation end command, it determines "YES", and ends the flow illustrated in FIG. 6. On the other hand, if the arithmetic processing unit of the system 10 does not receive the operation end command, it determines "NO", and returns to Step S2.

As described above, in this embodiment, the normal workflow execution section 16 simulatively executes the normal workflow in the test communication environment 60V, 80V (Step S4), and the communication monitoring section 18 monitors the information and communication in the test communication environment 60V, 80V (Step S5). In this way, it is possible to reliably detect an artful risk, such as malware having latency periods, and analyze the purpose and behavior of the malware in detail.

Also, in this embodiment, the test communication environment setting section 14 sets the virtual communication environment 60V or 80V that virtualizes the communication environment 60 or 80 as the test communication environment 60V or 80V when a security incident is detected.

According to this configuration, it is possible to establish the test communication environment 60V or 80V with making use of the resources of the communication environment 50. In addition, when a security incident is detected, it is possible to quickly utilize surplus resources in the communication environment 50 as the test communication environment 60V or 80V.

Also, in this embodiment, the normal workflow execution section 16 executes the normal workflow in the test communication environment 60V at a higher or lower speed than when the normal workflow is executed in the communication environment 50, as described above.

When the normal workflow is executed at a higher speed in the test communication environment 60V, 80V, it is possible to activate latent malware at an early stage, and shorten the period until the malware achieves its purpose. Accordingly, it is possible to analyze the risk of the malware, etc., more quickly.

On the other hand, when the normal workflow is executed at a lower speed in the test communication environment 60V, 80V, the communication speed at the time of executing the normal workflow in the test communication environment 60V, 80V can be suppressed, and therefore the load on the resources of the communication environment 50 when executing the normal workflow runtime can be reduced.

Figure 7:
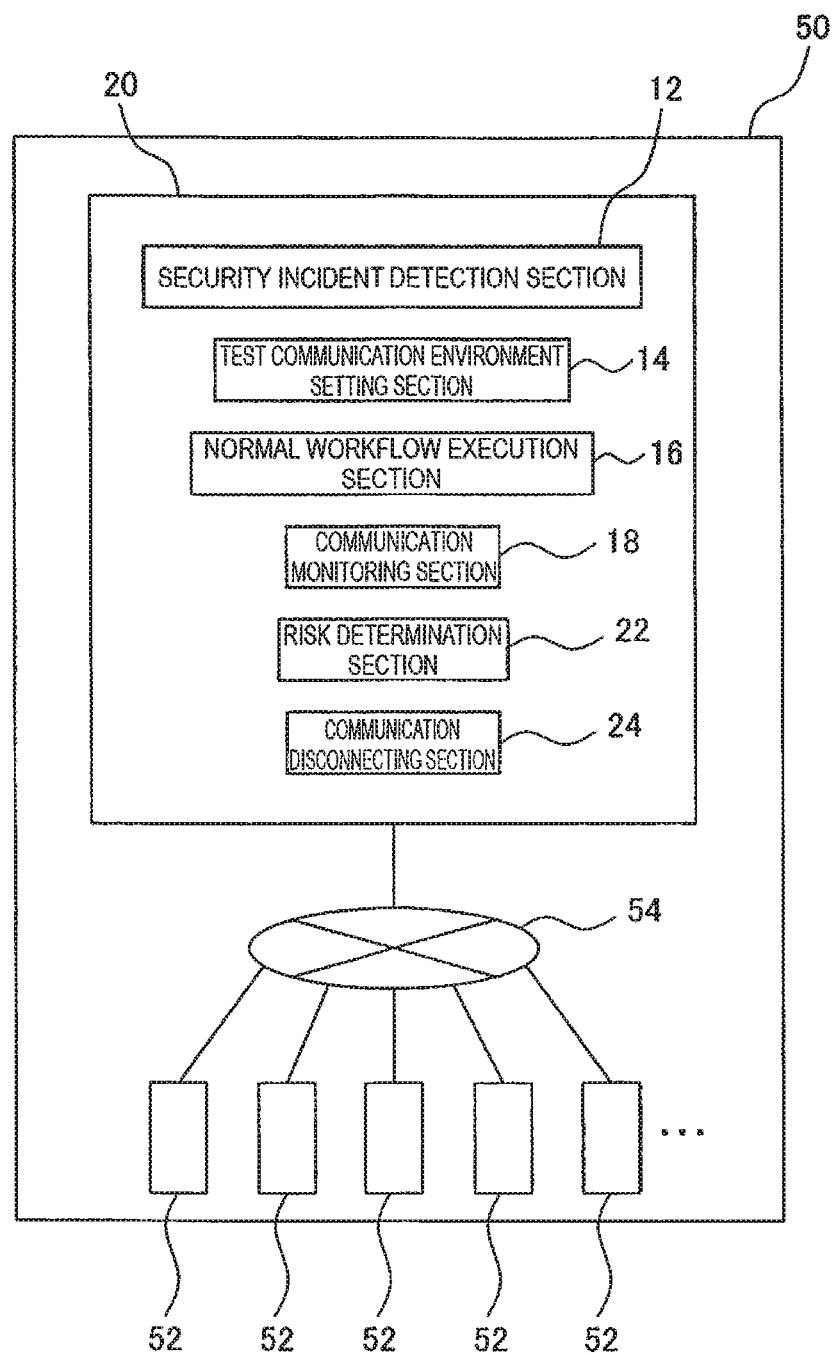
FIG. 7 is a block diagram of a communication environment according to another embodiment.

Next, a system 20 according to another embodiment will be described with reference to FIG. 7. Similarly as the above-mentioned system 10, the system 20 is communicably connected to the communication network 54, and constitutes the communication environment 50. For example, the system 20 is comprised of a server having an arithmetic processing unit (e.g., a CPU) and a storage. The system 20 differs from the above-mentioned system 10 in that it further includes a risk determination section 22 and a communication disconnecting section 24.

The risk determination section 22 is configured to analyze the security incident detected by the security incident detection section 12, and determine whether or not the degree of risk of the security incident is high. For example, the risk determination section 22 accesses a security incident database provided outside of the communication environment 50, and acquires the latest information on the security incidents. In the security incident database, information on security incidents that may occur in the communication environment is stored and periodically updated.

The risk determination section 22 analyzes the detected security incident by comparing the information of the security incident detected by the security incident detection section 12 with the latest information acquired from the security incident database.

Then, the risk determination section 22 determines whether the degree of risk of the detected security incident is high. For example, if there is a trace of malicious malware in the detected security incident (unauthorized access, etc.), the risk determination section 22 determines that the degree of risk of the security incident is high.

The communication disconnecting section 24 is configured to disconnect the communication between the test communication environment 60V, 80V and a section of the communication environment 50 other than the test communication environment 60V, 80V, if the risk determination section 22 determines that the degree of risk is high.

As an example, when the test communication environment setting section 14 sets the test communication environment 60V illustrated in FIG. 3, the communication disconnecting section 24 controls the network switch that connects section 50A of the communication environment 50 other than the test communication environment 60V with the test communication environment 60V so as to disconnect the communication between the section 50A and the test communication environment 60V.

As another example, when the test communication environment setting section 14 sets the test communication environment 80V as illustrated in FIG. 5, the communication disconnecting section 24 controls the network switch that connects section 50B of the communication environment 50 other than the test communication environment 80V with the test communication environment 80V so as to disconnect the communication between the section 50B and the test communication environment 80V.

Note that, the above-described functions of the risk determination section 22 and the communication disconnecting section 24 is carried out by the arithmetic processing unit of the system 20.

Figure 8:
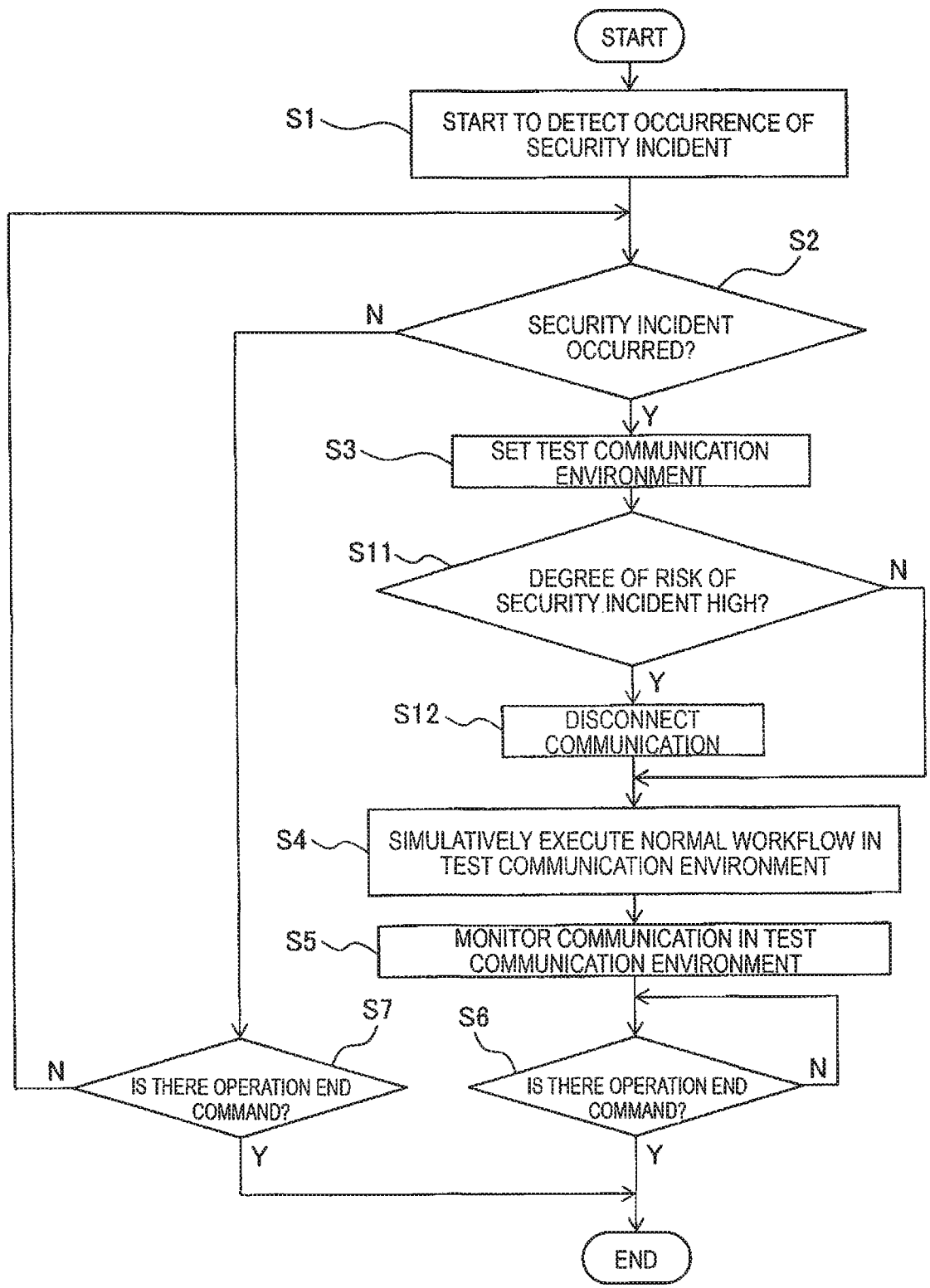
FIG. 8 is a flowchart illustrating an example of an operation flow of the system illustrated in FIG. 7.

Next, an example of the operation flow of the system 20 will be described with reference to FIG. 8. Note that, in the flow depicted in FIG. 8, the processes similar to those of the flow depicted in FIG. 6 are assigned the same reference numerals, and repetitive explanations thereof will be omitted.

After Step S3, in Step S11, the risk determination section 22 determines whether the degree of risk of the security incident detected by the security incident detection section 12 is high, as described above.

If the risk determination section 22 determines that the degree of risk of the detected security incident is high (i.e., determines "YES"), it proceeds to Step S12. On the other hand, if the risk determination section 22 determines that the degree of risk of the detected security incident is not high (i.e., determines "NO"), it proceeds to step S4.

In Step S12, the communication disconnecting section 24 disconnects the communication between the section of the communication environment 50 other than the test communication environment 60V, 80V (i.e., the section 50A, 50B) and the test communication environment 60V, 80V, as described above.

In this way, in this embodiment, when it is determined that the degree of risk of the detected security incident is high, the communication between the section 50A, 50B of the communication environment 50 and the test communication environment 60V, 80V is disconnected. Then, in step S4, the normal workflow execution section 16 simulatively executes the normal workflow in the test communication environment 60V, 80V. According to this configuration, if the malware, etc., having a high degree of risk becomes active in the test communication environment 60V, 80V while the normal workflow is executed in the test communication environment 60V, 80V, it is possible to prevent the section 50A, 50B used for the normal operations from being damaged by the malware.

Figure 9:
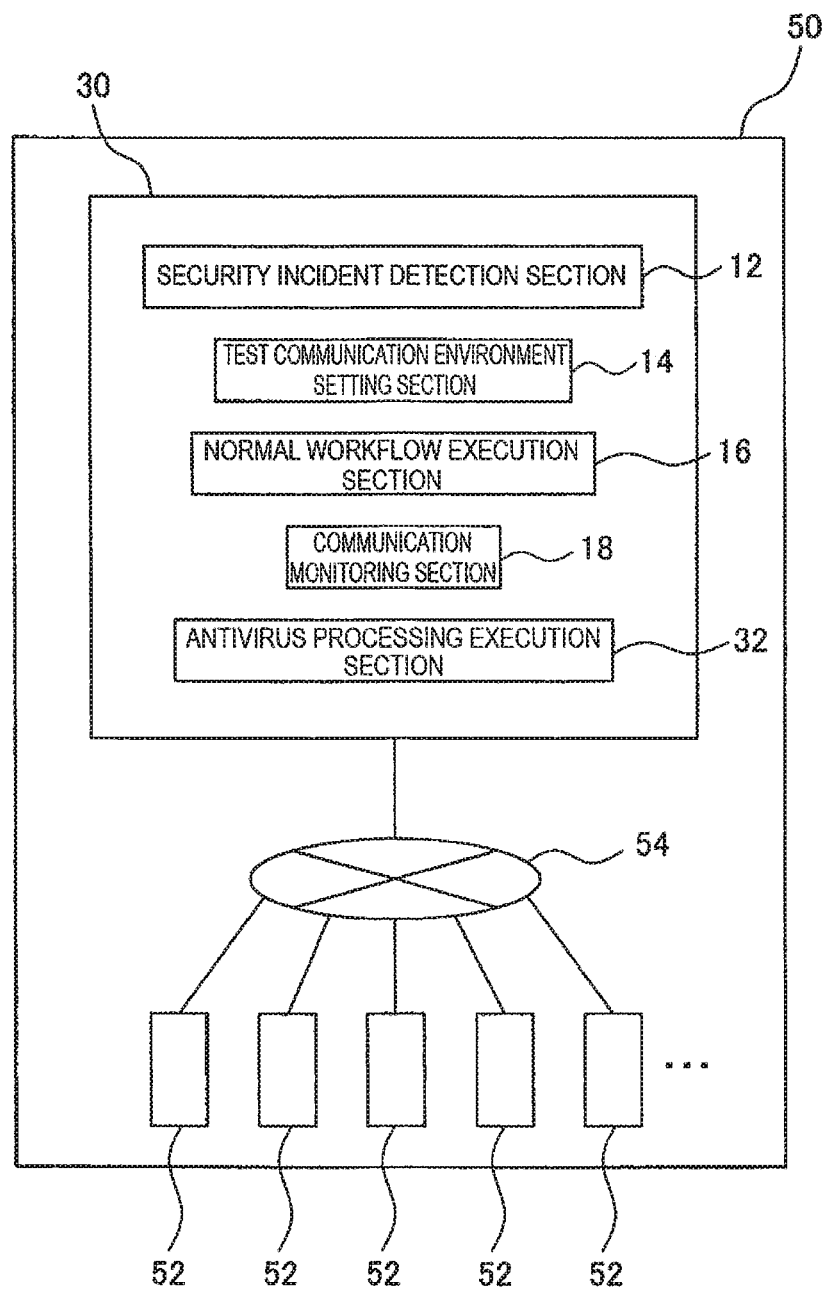
FIG. 9 is a block diagram of a communication environment according to still another embodiment.

Next, a system 30 according to another embodiment will be described with reference to FIG. 9. Similar as the above-mentioned system 10, the system 30 is communicably connected to the communication network 54, and constitutes the communication environment 50. For example, the system 30 is comprised of a server having an arithmetic processing unit (e.g., a CPU) and a storage. The system 30 differs from the above-mentioned system 10 in that it further includes an antivirus processing execution section 32.

The antivirus processing execution section 32 is configured to execute antivirus processing to the test communication environment 60V, 80V after an anomaly occurs in the information or communication monitored by the communication monitoring section 18 due to malware, etc., intruding into the communication environment 50. For example, the antivirus processing execution section 32 periodically accesses a database of antivirus software provided outside of the communication environment 50, and downloads the latest antivirus software therefrom.

The antivirus processing execution section 32 uses the latest antivirus software to execute antivirus processing against the malware, etc., active in the test communication environment 60V, 80V.

After the antivirus processing execution section 32 executes the antivirus processing, the communication monitoring section 18 continuously monitors the communication in the normal workflow carried out in the test communication environment 60V, 80V. Note that, the function of the antivirus processing execution section 32 is carried out by the arithmetic processing unit of the system 30.

Next, an example of an operation flow of the system 30 will be described with reference to FIG. 10. Note that, in the flow illustrated in FIG. 10, the processes similar to those of the flow depicted in FIG. 6 are assigned the same reference numerals, and repetitive explanations thereof will be omitted.

After Step S5, in Step S21, the communication monitoring section 18 determines whether the malware activity is detected in the monitored test communication environment 60V, 80V. For example, the communication monitoring section 18 statistically compares the communication carried out in the test communication environment 60V, 80V with the communication that is to be carried out when the normal workflow is properly executed in the communication environment 50, and determines whether there is a significant difference therebetween. If there is the difference therebetween, the communication monitoring section 18 determines that the malware activity is detected (i.e., determines "YES"), and proceeds to Step S22. On the other hand, if the two are substantially the same, the communication monitoring section 18 determines that the malware activity is not detected (i.e., determines "NO"), and proceeds to Step S23.

In Step S22, the antivirus processing execution section 32 executes the antivirus processing to the test communication environment 60V, 80V in which the malware is active, as described above.

The normal workflow execution section 16 continuously executes the normal workflow in the test communication environment 60V, 80V until it is determined "YES" in Step S6, and the communication monitoring section 18 continuously monitors the communication in the test communication environment 60V, 80V after the execution of antivirus processing.

On the other hand, if it is determined "NO" in Step S21, in Step S23, the arithmetic processing unit of the system 30 determines whether it receives the operation end command from the operator, similar to the above-mentioned Step S6.

Figure 10:
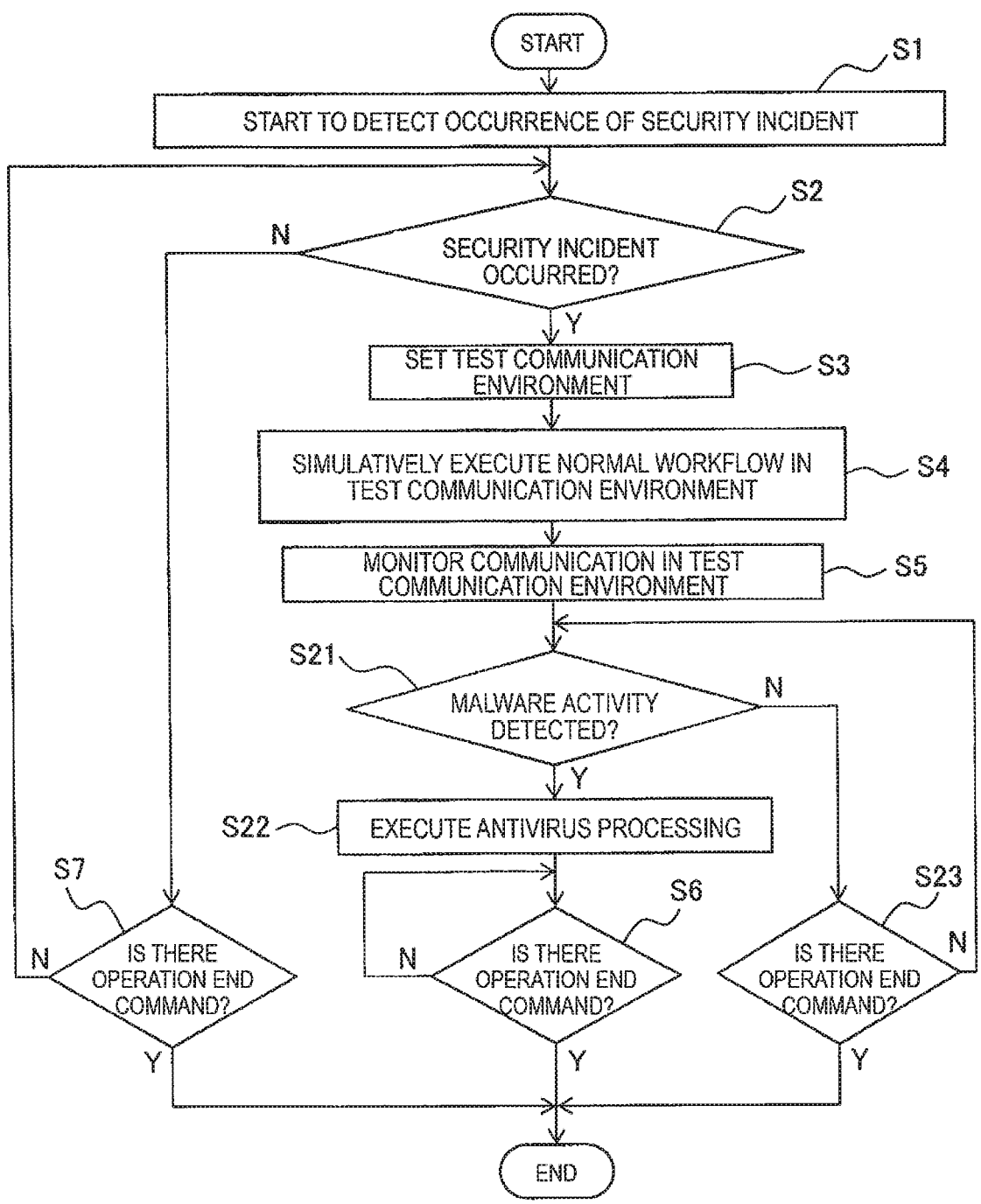
FIG. 10 is a flowchart illustrating an example of an operation flow of the system illustrated in FIG. 9.

If the arithmetic processing unit of the system 30 receives the operation end command, it determines "YES", and ends the flow illustrated in FIG. 10. In contrast, if the arithmetic processing unit of the system 30 does not receive the operation end command, it determines "NO", and returns to step S21.

As described above, in this embodiment, the antivirus processing execution section 32 executes antivirus processing to the test communication environment 60V, 80V after an anomaly occurs in the communication in the normal workflow carried out in the test communication environment 60V, 80V due to the malware, etc.

After the antivirus processing execution section 32 executes the antivirus processing, the communication monitoring section 18 continuously monitors the communication in the normal workflow carried out in the test communication environment 60V, 80V.

According to this configuration, the operator can monitor the behavior of the malware when antivirus processing is executed against the malware active in the test communication environment 60V, 80V. Due to this, the operator can analyze the properties (purpose, behavior) of the malware in greater detail, and therefore it is possible to find the source of the malware and prepare more effective defensive measures against the malware.

Next, systems 40A and 40B according to another embodiment will be described with reference to FIG. 11. Each of the systems 40A and 40B is communicably connected to the communication network 54, and constitutes the communication environment 50.

For example, the system 40A is an information security management system (ISMS) that governs information security in the communication environment 50, and is comprised of a plurality of communication devices (PC, server, etc.) and a communication network communicably connecting the plurality of communication devices to each other.

The system 40A includes the security incident detection section 12, the test communication environment setting section 14, the normal workflow execution section 16, the communication monitoring section 18, the risk determination section 22, the communication disconnecting section 24, and the antivirus processing execution section 32.

The functions of the security incident detection section 12, the test communication environment setting section 14, the normal workflow execution section 16, the communication monitoring section 18, the risk determination section 22, the communication disconnecting section 24, and the antivirus processing execution section 32 of the system 40A are carried out by at least one of the plurality of communication devices constituting the system 40A.

The system 40B is a system that carries out the function of the host controller 62, the robot controller 66, or the information management server 82, for example, and includes an arithmetic processing unit (CPU) and a storage (e.g., a ROM or a RAM).

The system 40B includes the security incident detection section 12, the test communication environment setting section 14, the normal workflow execution section 16, the communication monitoring section 18, the risk determination section 22, the communication disconnecting section 24, and the antivirus processing execution section 32.

The functions of the security incident detection section 12, the test communication environment setting section 14, the normal workflow execution section 16, the communication monitoring section 18, the risk determination section 22, the communication disconnecting section 24, and the antivirus processing execution section 32 of the system 40B are carried out by the arithmetic processing unit of the system 40B.

Figure 12:
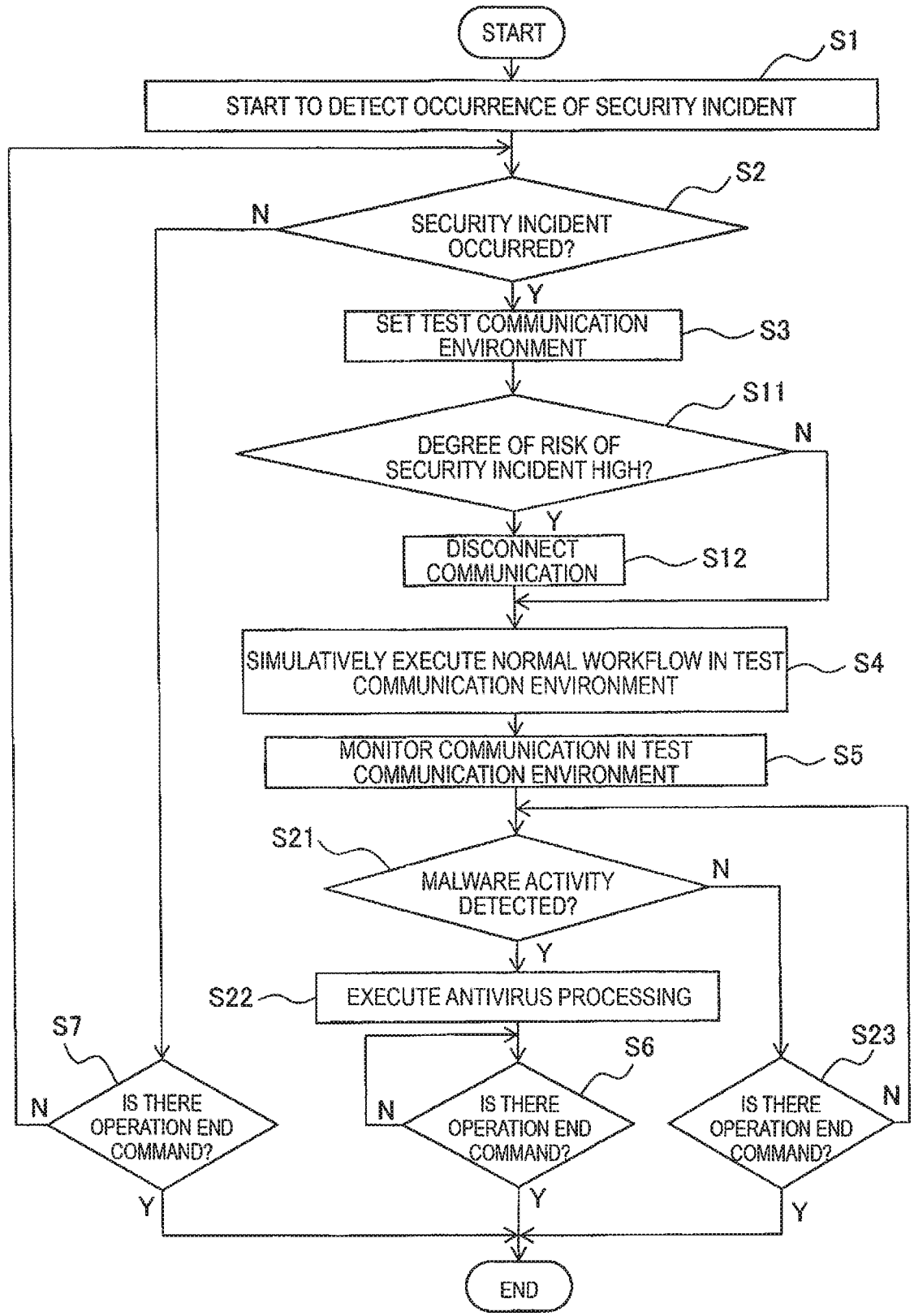
FIG. 12 is a flowchart illustrating an example of an operation flow of each system illustrated in FIG. 11.

Each of the systems 40A and 40B executes the operation flow depicted in FIG. 12. Note that, since each step of the operation flow illustrated in FIG. 12 is similar to the flow illustrated in FIG. 6, FIG. 8, and FIG. 10, the detailed description thereof will be omitted herein.

Figure 11:
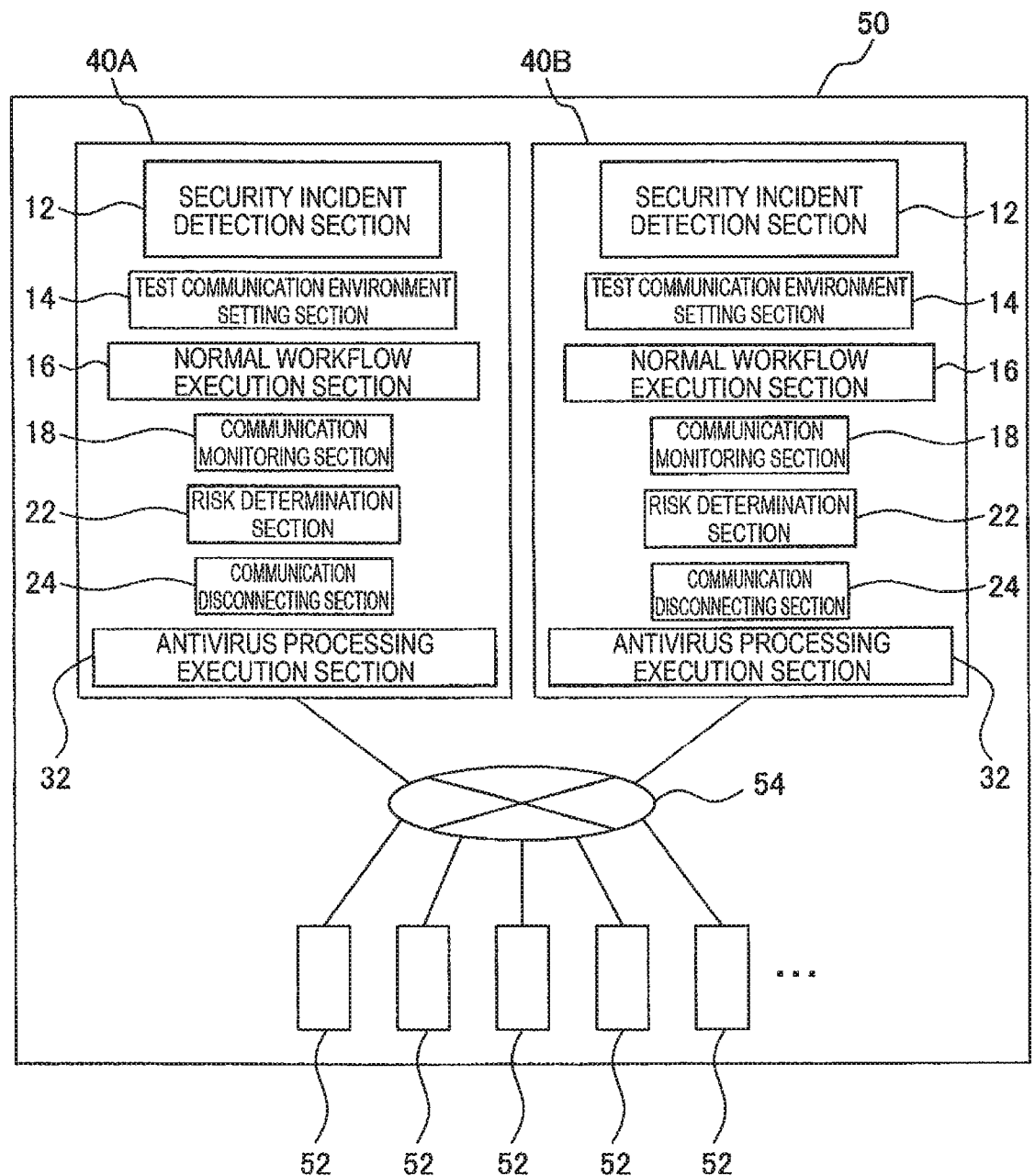
FIG. 11 is a block diagram of a communication environment according to still another embodiment.

Thus, in the communication environment 50 illustrated in FIG. 11, each of the systems 40A and 40B executes the processes of detecting the security incident (Step S1), setting the test communication environment 60V, 80V (Step S3), determining the degree of risk (Step S11), disconnecting the communication (Step S12), executing the normal workflow (Step S4), monitoring information and communication (Step S5), and executing antivirus processing (Step S22).

Figure 13:
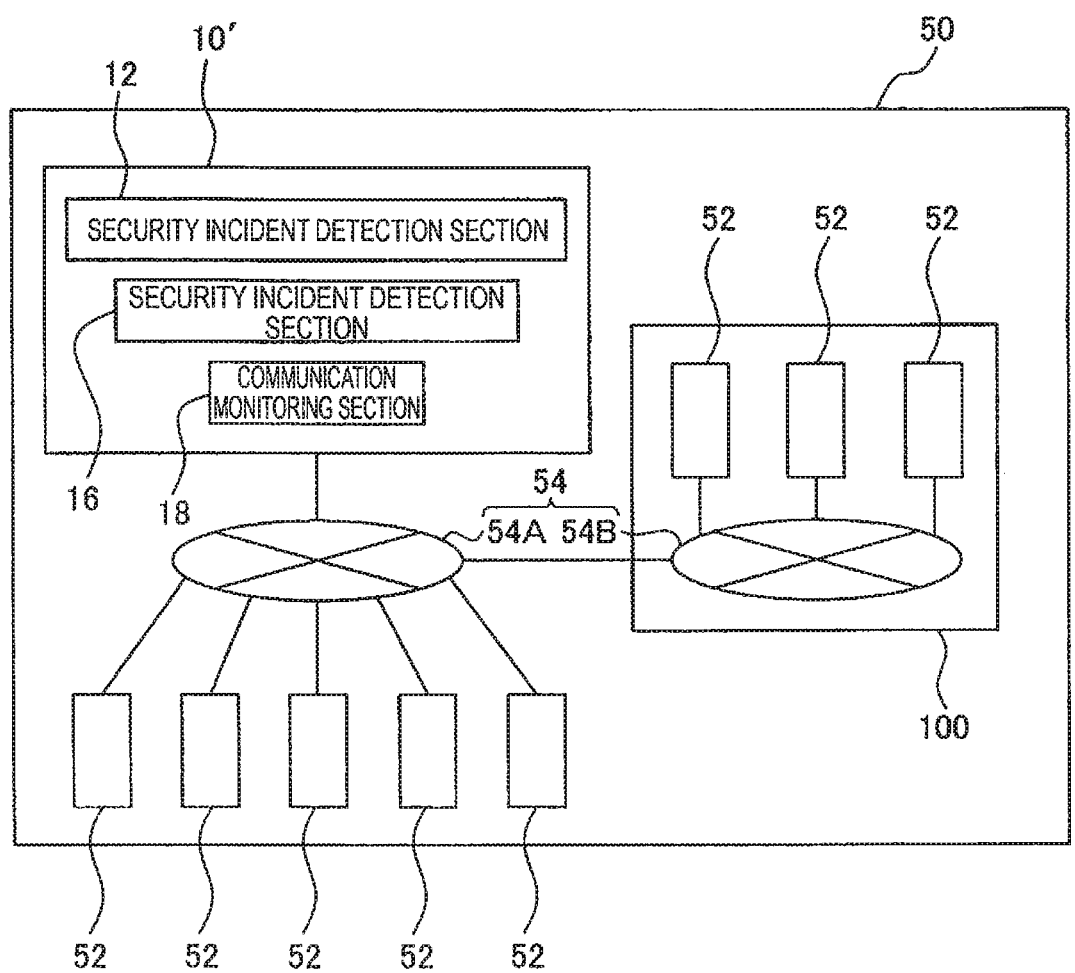
FIG. 13 is a block diagram of a communication environment according to still another embodiment.
Figure 14:
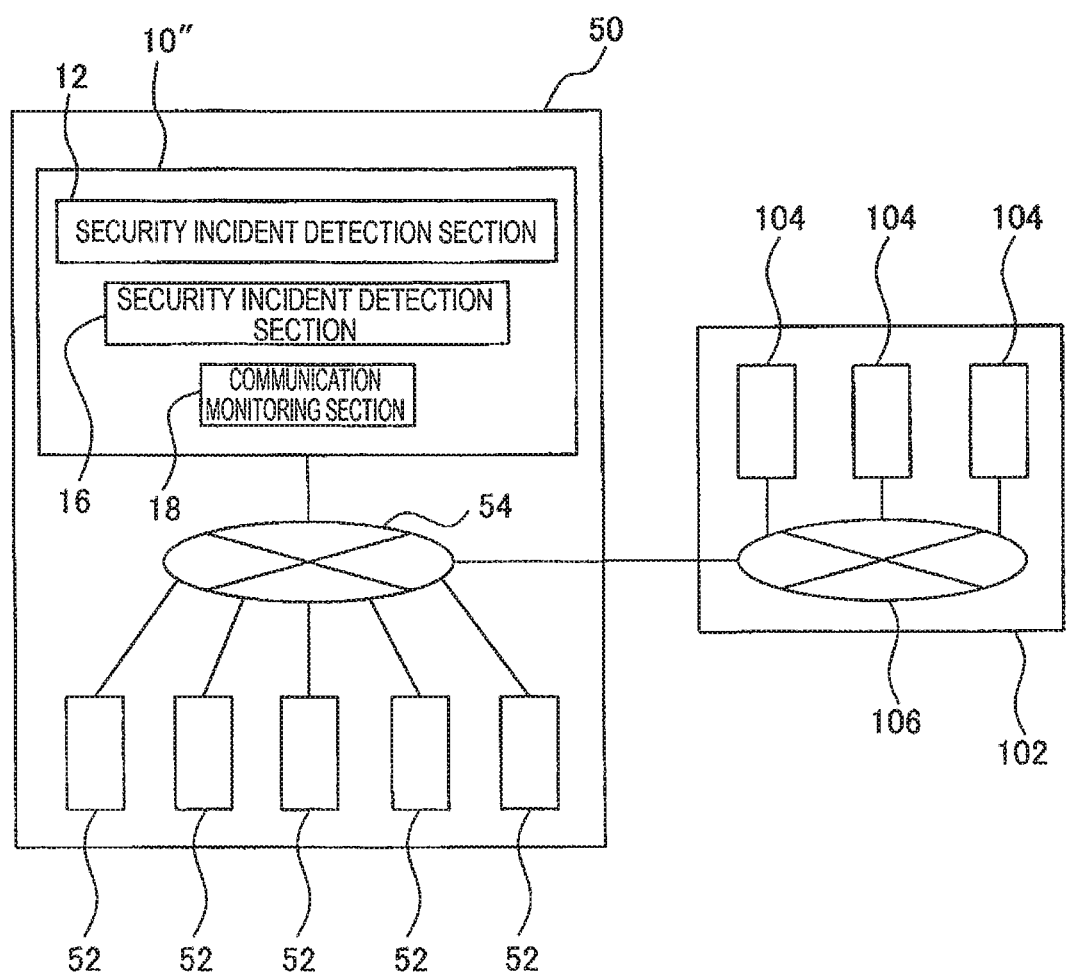
FIG. 14 is a block diagram of a communication environment according to still another embodiment.

Note that, the system 10, 20, 30, 40A, or 40B may not include the test communication environment setting section 14. FIG. 13 and FIG. 14 illustrate such an embodiment.

The system 10' illustrated in FIG. 13 includes the security incident detection section 12, the normal workflow execution section 16, and the communication monitoring section 18, and is connected to a first communication network 54A.

In the communication environment 50 illustrated in FIG. 13, a test communication environment 100 is previously provided as a part of the communication environment 50. The test communication environment 100 includes some of the plurality of communication devices 52 constituting the communication environment 50, and a second communication network 54B that communicably connects the communication devices 52 of the test communication environment 100.

The first communication network 54A and the second communication network 54B constitutes the communication network 54 described above.

When the security incident detection section 12 detects a security incident, the normal workflow execution section 16 of the system 10' simulatively executes the normal workflow in the test communication environment 100 provided in advance.

On the other hand, the system 10" illustrated in FIG. 14 includes the security incident detection section 12, the normal workflow execution section 16, and the communication monitoring section 18, and is connected to the communication network 54.

In the embodiment illustrated in FIG. 14, a test communication environment 102 is previously provided as a communication environment different from the communication environment 50. The test communication environment 102 includes a plurality of communication devices 104 and a communication network 106 communicably connecting the plurality of communication devices 104 to each other.

The communication network 106 is communicably connected to the communication network 54. For example, communication between the test communication environment 102 and a communication network outside of the communication environment 50 (e.g., the Internet) may be disconnected.

When the security incident detection section 12 detects a security incident, the normal workflow execution section 16 of the system 10" simulatively executes the normal workflow in the test communication environment 102 provided in advance.

Similar to the above-described embodiments, in the system 10' or the system 10", malware may be activated in the test communication environment 100 or 102 by executing the normal workflow in the test communication environment 100 or 102, and therefore the purpose and behavior of the malware can be analyzed.

Note that, the test communication environment setting section 14 may set the test communication environment 60V, 80V so as to include the resource of the communication environment 50 in which the security incident (e.g., unauthorized access) occurs.

For example, it is assumed that the security incident detection section 12 detects occurrence of a security incident (unauthorized access, etc.) in a first communication device 52. In this case, when setting the test communication environment 60V illustrated in FIG. 3, the test communication environment setting section 14 may use the resource of the first communication device 52 to establish the virtual host controller 62V, the virtual robot controller 66V, the virtual vision sensor 72V, and the virtual servo motors 74V.

Alternatively, when setting the test communication environment 80V illustrated in FIG. 5, the test communication environment setting section 14 uses the resource of the first communication device 52 to establish the virtual information management server 82V, the virtual ID reader 88V, or the virtual PC 90V. By setting the test communication environment in this manner, it is possible to use the resource, in which the malware, etc., may be latent, as the constituent of the test communication environment 60V, 80V.

Further, when the workflow execution section 16 detects that the malware, etc., is activated in the test communication environment 60V, 80V, the normal workflow execution section 16 may suspend the normal workflow. Further, when the communication monitoring section 18 detects that the malware, etc., is activated in the test communication environment 60V, 80V, it may suspend monitoring the communication in the test communication environment 60V, 80V. Further, the features of the systems 10, 20, and 30 may be combined.

Although the present disclosure has been described with reference to the embodiments, the above-described embodiments do not limit the invention according to the claims. Further, a configuration combining the features described in the embodiments may also be included in the technical scope of the present disclosure, but not all combinations of these features are necessarily essential for implementation of the solution proposed in the invention. Further, it will be apparent to those skilled in the art that various modifications or improvements can be added to the above-described embodiments.

In addition, the order of execution of each process of the operations, procedures, steps, stages, phases, and the like of the devices, systems, programs, and methods illustrated in the claims, the specification, and the figures is not explicitly specified as "before", "prior", etc., and the output of preceding processes can be implemented in any order provided it is not used by later processing. With respect to the operation flow in the claims, the specification, and the figures, even when the terms "first", "next", "then", or "subsequently", are used for the sake of convenience, this does not mean that it is necessary for operations to be performed in this order.

The invention claimed is:

1. A system configured to detect intrusion into a communication environment in which a plurality of communication devices is communicably connected via a communication network, the system comprising a processor configured to
monitor information or communication in the communication environment and detect occurrence of a security incident in the communication environment,
simulatively execute a normal workflow, which is predetermined to be executed in the communication environment by at least one of the communication devices, in a test communication environment provided as a part of the communication environment or another communication environment different from the communication environment, in response to detecting the security incident,
monitor information or communication in the test communication environment when the normal workflow is executed in the test communication environment,
set, as the test communication environment, a virtual communication environment in which at least two virtual communication devices virtualizing at least two of the communication devices are communicably connected via a virtual communication network virtualizing the communication network, in response to detecting the security incident,
analyze the security incident,
determine a degree of risk of the security incident,
in response to determining that the degree of risk of the security incident is higher than a predetermined threshold,
disconnect the communication between the test communication environment and the part of the communication environment other than the test communication environment, when the test communication environment is provided as the part of the communication environment, and
disconnect the communication between the test communication environment and the communication environment, when the test communication environment is provided as the another communication environment, and
simulatively allow events of the information or communication anomalies, which are predicted to occur due to the intrusion into the communication environment when the normal workflow is executed, to occur when the normal workflow is executed in the test communication environment.

2. The system of claim 1, further comprising a storage configured to pre-store the events.

3. The system of claim 1, wherein the processor is configured to execute the normal workflow at a speed higher or lower than that at which the at least one communication device executes the normal workflow in the communication environment.

4. The system of claim 1, wherein the processor is configured to continuously execute the normal work flow after an actual anomaly occurs in the information or the communication monitored due to the intrusion into the communication environment.

5. The system of claim 4, wherein the processor is configured to execute antivirus processing to the test communication environment after the actual anomaly occurs in the information or the communication monitored due to the intrusion in the communication environment.

6. The system of claim 1, wherein the processor is configured to change the speed at which the normal workflow is executed based on the security incident when the normal workflow is executed in the test communication environment, so that the speed at which the processes of the normal workflow, that relate to the security incident, is executed is different from the speed at which the processes of the normal workflow, that do not relate to the security incident, is executed.

7. The system of claim 6, wherein the processor is configured to
continuously execute the processes, which relate to the security incident and
stop the processes, which do not relate to the security incident after detecting the security incident.

8. A method of detecting intrusion into a communication environment in which a plurality of communication devices is communicably connected via a communication network, the method comprising:
monitoring information or communication in the communication environment and detecting occurrence of a security incident in the communication environment; and
in response to detecting the security incident,
setting, as a test communication environment, a virtual communication environment in which at least two virtual communication devices virtualizing at least two of the communication devices are communicably connected via a virtual communication network virtualizing the communication network, wherein the test communication environment is provided as a part of the communication environment or another communication environment different from the communication environment,
analyzing the security incident,
determining a degree of risk of the security incident,
in response to the degree of risk of the security incident being higher than a predetermined threshold,
disconnecting the communication between the test communication environment and the part of the communication environment other than the test communication environment, when the test communication environment is provided as the part of the communication environment, and
disconnecting the communication between the test communication environment and the communication environment, when the test communication environment is provided as the another communication environment,
simulatively executing a normal workflow, which is predetermined to be executed in the communication environment by at least one of the communication devices, in the test communication environment,
monitoring information or communication in the test communication environment when executing the normal workflow in the test communication environment, and
simulatively allowing events of the information or communication anomalies, which are predicted to occur when the normal workflow is executed by the intrusion into the communication environment, to occur when the normal workflow is executed in the test communication environment.

* * * * *